United States Patent
Ni et al.

(10) Patent No.: US 9,503,936 B2
(45) Date of Patent: Nov. 22, 2016

(54) OPTIMIZING SUPPLEMENTARY SERVICE OPERATIONS FOR LTE-ENABLED DEVICES

(71) Applicant: Spreadtrum Communications (Shanghai) Co., Ltd., Shanghai (CN)

(72) Inventors: Jinjin Ni, Shangahi (CN); Yi Jin, Shanghai (CN); Xichun Gao, Shanghai (CN); Xianliang Chen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 171 days.

(21) Appl. No.: 14/091,351

(22) Filed: Nov. 27, 2013

(65) Prior Publication Data

US 2015/0103739 A1 Apr. 16, 2015

(30) Foreign Application Priority Data

Oct. 10, 2013 (EP) .................... 13188046

(51) Int. Cl.
| | |
|---|---|
| *H04W 36/00* | (2009.01) |
| *H04W 4/16* | (2009.01) |
| *H04W 48/18* | (2009.01) |
| *H04W 88/06* | (2009.01) |
| *H04W 4/18* | (2009.01) |
| *H04W 28/02* | (2009.01) |

(52) U.S. Cl.
CPC ........... *H04W 36/0022* (2013.01); *H04W 4/16* (2013.01); *H04W 4/18* (2013.01); *H04W 28/0289* (2013.01); *H04W 48/18* (2013.01); *H04W 88/06* (2013.01)

(58) Field of Classification Search
CPC ...................... H04L 65/1066; H04W 36/0022
See application file for complete search history.

(56) References Cited

U.S. PATENT DOCUMENTS

| | | | |
|---|---|---|---|
| 8,400,931 B2* | 3/2013 | Wong et al. ................... | 370/244 |
| 2007/0254681 A1* | 11/2007 | Horvath ................... | H04W 4/14 |
| | | | 455/466 |
| 2010/0120455 A1* | 5/2010 | Aghili et al. ................. | 455/466 |
| 2014/0341041 A1* | 11/2014 | Velev ................... | H04Q 3/0045 |
| | | | 370/236 |

FOREIGN PATENT DOCUMENTS

| | | |
|---|---|---|
| CN | 101442812 A | 5/2009 |
| CN | 102160403 A | 8/2011 |
| WO | 2012092071 A1 | 7/2012 |

* cited by examiner

*Primary Examiner* — Hoon J Chung
*Assistant Examiner* — Zhensheng Zhang
(74) *Attorney, Agent, or Firm* — Kilpatrick Townsend & Stockton LLP

(57) ABSTRACT

A method of optimizing transactions involving Call Independent Supplementary Service (CISS) data on a Long Term Evolution (LTE) device may include receiving an indication that the CISS data should be transmitted between the device and a core network. The method may also include determining whether the device is standing by in a packet-switched LTE network or standing by in a 3G/2G network. In response to a determination that the device is standing by in the packet-switched LTE network, the method may additionally include packaging the CISS data in a control layer message and sending the control layer message between the core network and the device in the packet-switched LTE network. In response to a determination that the device is standing by in the circuit-switched 3G/2G network, the method may further include sending the CISS data between the core network and the device in the circuit-switched 3G/2G network.

20 Claims, 10 Drawing Sheets

400b

| Information Element | Type/Reference | Presence | Format | Length |
|---|---|---|---|---|
| Protocol Discriminator | Protocol Discriminator | M | V | 1/2 |
| Security Header Type | Security Header Type | M | V | 1/2 |
| Uplink/Downlink NAS transport message identity | Message type | M | V | 1 |
| NAS message container | NAS message container | M | LV | 3-252 |

OPTIMIZING SUPPLEMENTARY SERVICE OPERATIONS FOR LTE-ENABLED DEVICES

CROSS REFERENCE TO RELATED APPLICATIONS

The present application claims priority to European patent application No. EP13188046.0, filed on Oct. 10, 2013, and entitled "OPTIMIZING SUPPLEMENTARY SERVICE OPERATIONS FOR LTE-ENABLED DEVICES", the entire disclosure of which is incorporated herein by reference.

BACKGROUND

Modern data and voice communications may take place over a cellular network or a mobile network. This may comprise a radio network distributed over land areas (referred to as cells), each served by at least one fixed-location transceiver, or base station. Mobile devices may communicate with a number of different servers, switches, routers, antenna, and/or the like, all of which form what may be referred to as a core network. Although originally developed mainly for cellular phone calls and other types of voice transmissions, most modern wireless networks have been adapted to handle data transmissions, such as web browsing, e-mail, text messaging, and file transfers.

Networks that were originally optimized for voice transmissions may have difficulty efficiently transmitting large-bandwidth sets of data packets for operations such as streaming videos or music downloads. As these networks transition to new data-optimized formats, traditional services offered to users may be caught in the middle. Therefore, improvements are needed in the art.

Currently, some commercial packet-switched networks are already available, such as the Long Term Evolution (LTE) networks. Consequently, many LTE-compatible mobile devices are also commercially available in both single-mode and multi-mode configurations. Despite the numerous data transmission advantages, LTE networks cannot directly provide circuit-switched services, such as Call Independent Supplementary Services (CISS). Typically, if an LTE-compatible mobile device attempts to make a voice call, the mobile device will fall back to a circuit-switched 3G/2G network. SMS text messages can be transmitted through the packet-switched domain of the LTE network. However, CISS is not directly supported in the LTE network. Falling back to a circuit-switched 3G/2G network for CISS services may affect other services and interfere with the user experience. Because CISS operations, such as call waiting setting and call forwarding setting, are expected by consumers, improvements in the art are needed.

SUMMARY

In one embodiment, a method of optimizing transactions involving Call Independent Supplementary Service (CISS) data on a Long Term Evolution (LTE) device may be presented. The method may include receiving an indication that the CISS data should be transmitted between the device and a core network and determining whether the device is standing by in a packet-switched LTE network or standing by in a 3G/2G network. In response to a determination that the device is standing by in the packet-switched LTE network, the method may also include packaging the CISS data in a control layer message and sending the control layer message between the core network and the device in the packet-switched LTE network. Or, in response to a determination that the device is standing by in the circuit-switched 3G/2G network, the method may additionally include sending the CISS data between the core network and the device in the circuit-switched 3G/2G network.

In another embodiment, a computer-readable memory may be presented. The computer-readable memory may have stored thereon a sequence of instructions which, when executed by one or more processors, causes the one or more processors to optimize transactions involving Call Independent Supplementary Service (CISS) data on a Long Term Evolution (LTE) device. The instructions may cause the processor(s) to receive an indication that the CISS data should be transmitted between the device and a core network and determine whether the device is standing by in a packet-switched LTE network or standing by in a 3G/2G network. In response to a determination that the device is standing by in the packet-switched LTE network, the instructions may also cause the processor(s) to package the CISS data in a control layer message and send the control layer message between the core network and the device in the packet-switched LTE network. Or, in response to a determination that the device is standing by in the circuit-switched 3G/2G network, the instructions may additionally cause the processor(s) to send the CISS data between the core network and the device in the circuit-switched 3G/2G network.

In yet another embodiment, a mobile device may be presented. The mobile device may include one or more processors and a memory communicatively coupled with and readable by the one or more processors. The memory may have stored therein a sequence of instructions which, when executed by the one or more processors, cause the one or more processors to optimize transactions involving Call Independent Supplementary Service (CISS) data on a Long Term Evolution (LTE) networks. The instructions may cause the processor(s) to The instructions may cause the processor (s) to receive an indication that the CISS data should be transmitted between the device and a core network and determine whether the device is standing by in a packet-switched LTE network or standing by in a 3G/2G network. In response to a determination that the device is standing by in the packet-switched LTE network, the instructions may also cause the processor(s) to package the CISS data in a control layer message and send the control layer message between the core network and the device in the packet-switched LTE network. Or, in response to a determination that the device is standing by in the circuit-switched 3G/2G network, the instructions may additionally cause the processor(s) to send the CISS data between the core network and the device in the circuit-switched 3G/2G network.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit, the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Described herein, are embodiments for optimizing transactions involving Call Independent Supplementary Service (MS) data on a device. The device may include a mobile device, such as a smart phone, and may be configured to operate in multiple network modes. For example, a smart phone may be configured to operate in a circuit-switched mode or a packet-switched mode. Typically, data transfers are more efficient over a packet-switched network, while voice transmissions are more effective over a circuit-switched network. The embodiments described herein enable a device to determine whether CISS data should be transmitted in a circuit-switched mode in 3G/2G or in a packet-switched mode in LTE directly. If the CISS data should be transmitted in a packet-switched mode, then the CISS data can be packaged in a control layer message, such as an Uplink NAS Transport message and/or a Downlink Transport message.

Figure 1:
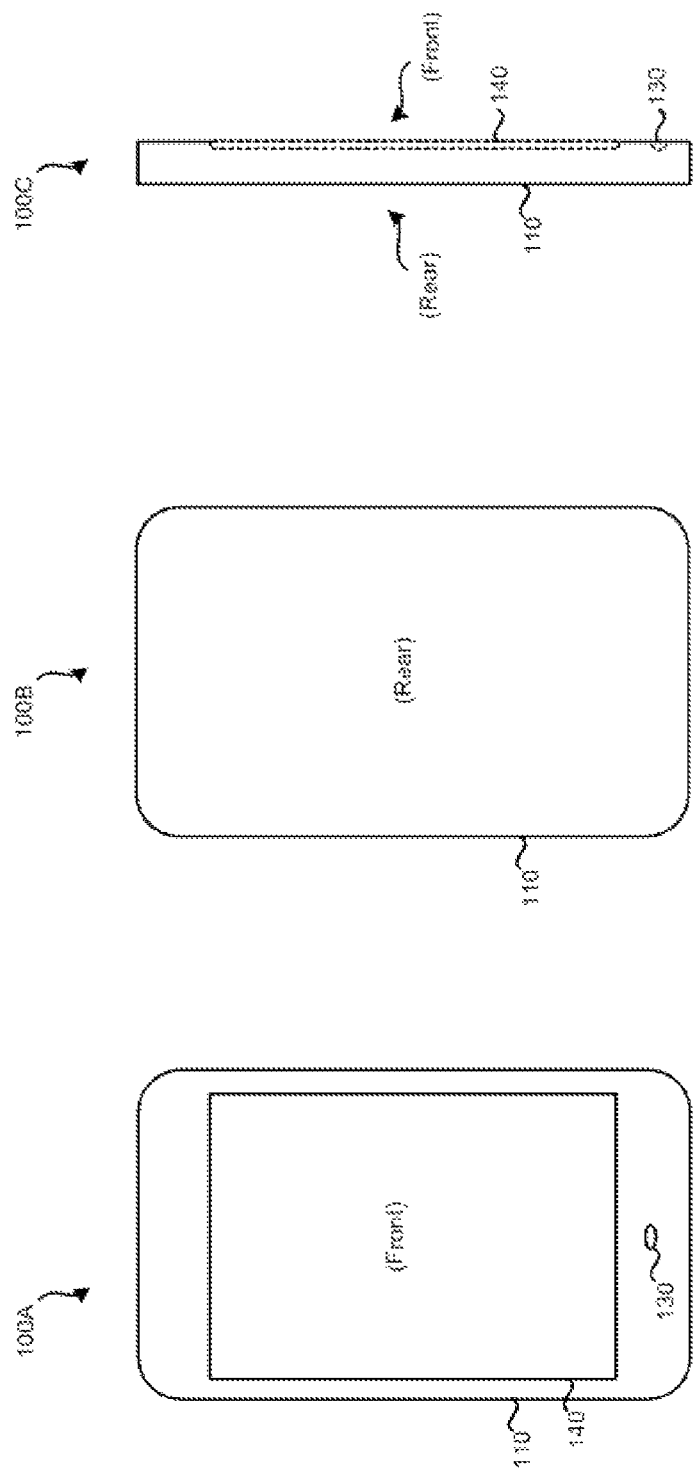
FIGS. 1A-1C illustrate various views of an examplary multi-mode device, according to one embodiment.

FIG. 1A illustrates an embodiment of a mobile device 100A from a front view. Mobile device 100A may include an advanced user interface including a display 140, a protective casing 110, and at least one microphone 130. The mobile device 100A may utilize the user interface to provide both basic and advanced features to a user. For example, the mobile device 100A may be configured to provide text messaging capabilities, call waiting, call transfers, call forwarding, call blocking, voicemail, account balances, Internet access, and/or the like. Also, the mobile device 100A provide functions that benefit a service provider, such as device authentication, location services, user authentication, and/or the like.

As used herein, the term "mobile device"—or simply "device"—may comprise any mobile computing device that may be configured to communicate with a network. For example, a mobile device may include a cellular telephone, a smart phone, a digital voice recorder, a notebook computer, a tablet computer, a radio, a wireless headset, and/or the like.

FIG. 1B illustrates an embodiment of a mobile device 100B from a rear view and FIG. 1C illustrates an embodiment of a mobile device 100C from a side view. Mobile device 100C may be mobile device 100A of FIG. 1A/or and mobile device 100B of FIG. 1B viewed from the side.

Figure 2:
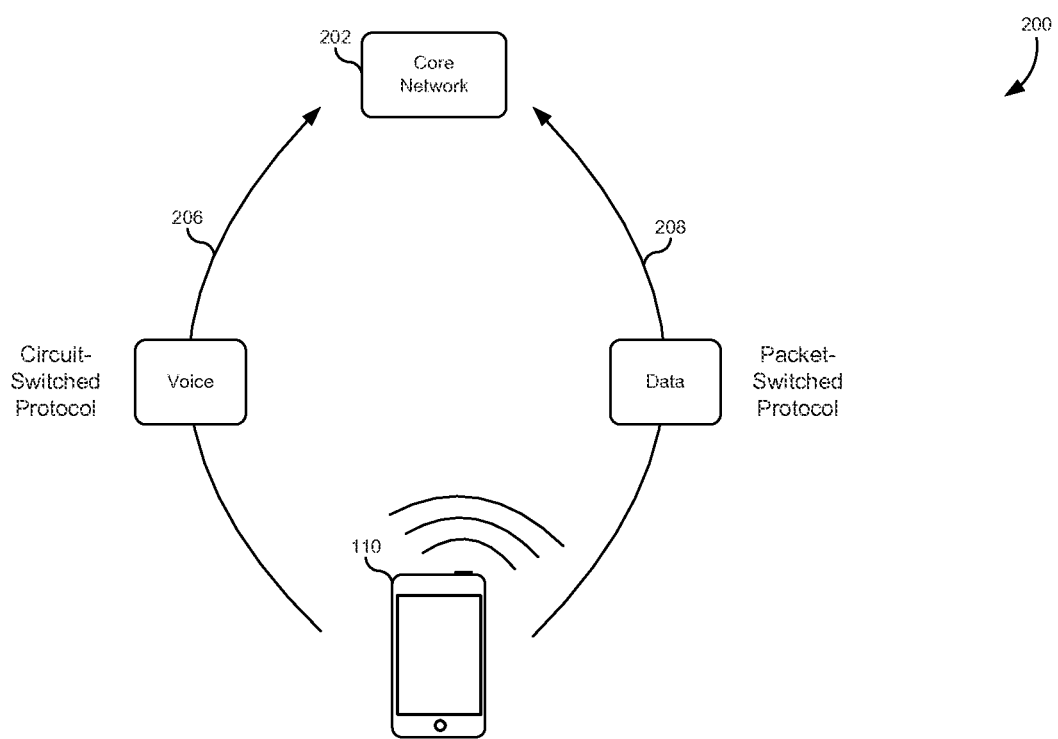
FIG. 2 illustrates a block diagram of communications between a device and a core network, according to one embodiment.

FIG. 2 illustrates a block diagram of communications between a device and a core network, according to one embodiment. The mobile device 110 in this particular embodiment is implemented using a smart phone. The mobile device 110 communicates with a core network 202 in order to transmit both data packets and voice transmissions. The core network 202 may be implemented by a wireless telephone service provider, an Internet provider, a wireless hotspot, and/or the like.

Typically, the mobile device 110 uses a circuit-switched network 206 to transmit voice transmissions between mobile device 110 and the core network 202. As used herein, a circuit-switched network provides dedicated, or semi-dedicated point-to-point connections for transmissions. A circuit-switched network may allow electronic signals to pass through several switches before a connection is established. During a dedicated transmission, other network traffic is typically not allowed to use the switches dedicated to the transmission. A circuit-switched network is often advantageous for applications with real-time requirements or limited end points. For mobile devices such as cell phones, live phone calls are typically transmitted using a circuit-switched protocol.

For data transmissions, such as file downloads, file transfers, web browsing, e-mail, RSS feeds, and/or the like, the mobile device 110 may typically use a packet-switched network to move data in separate small blocks, i.e. packets, based on a destination address included in each packet. As used herein, a "packet-switched network" describes a network where transmissions are broken up into packets and sent through various routes that may be determined in real time and reassembled in the proper sequence to re-create the original data. The most efficient route for each individual packet may be determined as circuits become available. Therefore, each packet may use a different route. The packet header address tells the network where the packet should be sent and describes the process for reassembly at the destination, In contrast to circuit-switched networks, packet-switched networks typically do not require dedicated transmission connections.

The mobile device 110 may operate in both a packet-switched mode and a circuit-switched mode. As used herein, these modes may refer to the type of network over which information will be transmitted by the mobile device 110. For example, if the mobile device 110 is sending/receiving a voice transmission over a circuit-switched network, then the mobile device 110 will be referred to as operating in a circuit-switched mode. Alternatively, if the mobile device 110 is sending/receiving a data transmission over a packet-switched network, then the mobile device 110 will be referred to as operating in a packet-switched mode.

Some modern wireless telecommunication networks are switching to a primarily packet-switched network configuration. By using a packet-switched network, telecommunication networks can provide higher transfer rates and greater connectivity. As users shift their Internet usage activity from desktop computers to mobile devices, providing data transfer rates that are comparable to landline connections is becoming more important for customer satisfaction.

Various so-called "4G" services are beginning to shift from circuit-switched networks to packet-switched networks. For example, the Long Term Evolution (LTE) standard for wireless communication of high-speed data from mobile phones and data terminals is based primarily on a packet-switched data network. The LTE specification provides peak downlink rates of 300 Mbit/s, latency of less than 5 ms in the radio access network, scalable carrier bandwidths, a simpler architecture, and lower operating costs.

Despite the advantages for data transmissions, the LTE standard only supports packet switching with its all-IP network. Voice calls and other standards (such as GSM, UMTS, and CDMA2000) may still use circuit-switched networks. Therefore, mobile devices that take advantage of the higher transmission rates of packet-switched networks must alter their traditional voice transmission protocol.

In some cases, the mobile device can simply use voice packets to transmit a phone call through a packet-switched network. However, the more common approach is to use a Circuit Switched Fallback (CSFB) approach. Here, the packet-switched network (LTE) simply provides data services. When a voice call is to be initiated or received, the mobile device will fall back into a circuit-switched mode. This solution allows operators to simply upgrade the mobile switching center (MSC) instead of deploying an IP Multimedia Subsystem (IMS), thus upgraded services can be quickly rolled out. Because the mobile device needs to switch from the circuit-switched network to the packet-switched network, there may be a longer call setup delay.

However, mobile devices can provide services other than voice transmissions and Internet data transmissions. Many devices offer services known as supplementary services (SS). Supplementary services can be used to modify or supplement basic services. Supplementary services can generally be classified into two categories: call dependent supplementary services (or call related supplementary services) and call independent supplementary services (CISS).

Call dependent supplementary services generally involve operations related to activity that takes place either during the call establishment phase, within the call connected phase, or during the call released phase of a voice transmission. Call dependent supplementary services may include calling line identification, call waiting, call hold, multiparty calls, and/or the like. In contrast, call independent supplementary services involve operations need not be associated with a particular phone call. In some embodiments, CISS operations may involve registration, activation, erasure, and/or deactivation operations by a mobile switching center. For example, the mobile switching center may interrogate the device for authentication information. This category of SS operations is not required to have any relation to an ongoing call. CISS operations may include call forwarding, balance inquiries, phone status information, settings and inquiries, and/or the like. As used in the art, SS and CISS are separate concepts from user-to-user SMS messaging.

Generally, mobile devices are configured to use a traditional circuit-switched network when executing SS and CISS operations. As described above, devices configured to use a packet-switched network during data transmissions are often required to change their operating mode to be compatible with a circuit-switched network during voice transmissions. Therefore, problems can arise if a device configured to operate on a packet-switched network needs to engage in CISS operations. Generally, the mobile device is required to switch back to the CSFB mode and use the circuit-switched network. This leads to an unnecessary expense in time and power involved in changing modes, particularly when and LTE or 3G/2G network is involved. Some embodiments presented herein provide ways for CISS operations to be performed over a packet-switched network, and thus not requiring the device mode or network to change.

Figure 3:
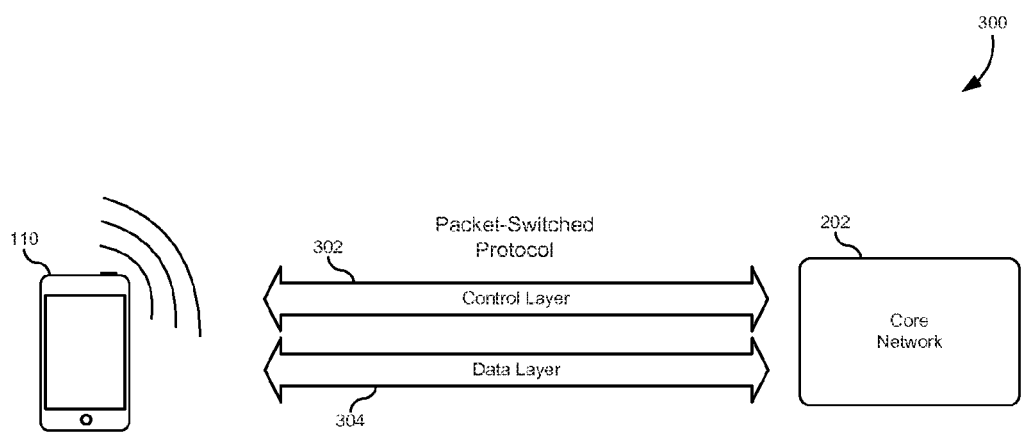
FIG. 3 illustrates a block diagram of layered communication in a packet-switched protocol, according to one embodiment.

FIG. 3 illustrates a block diagram of layered communication in a packet-switched protocol, according to one embodiment. In some embodiments, the packet-switched protocol may be divided into at least two different communication layers. First, the packet-switched protocol may include a data layer 304. In some networks, this may be referred to as the Access Stratum (AS). The data layer 304 can provide a means for carrying information over a wireless interface and also to manage the resources of the wireless interface. In some networks, the data layer 304 may provide services to a control layer 302. For example, control layer messages can be transported via the data layer 304.

The control layer 302 may include protocols that apply between the device 110 and the core network 202. For these protocols, the data layer 304 can act as a carrier or transport layer. The control layer 302 protocols may persist throughout the transition between the device 110 and the core network 202. In one embodiment, the control layer 302 may be referred to as a Non-Access Stratum (NAS).

As will be described in further detail below, messages of the control layer 302 may be used to package CISS information for transmission while the device 110 is operating in a packet-switched mode. The control layer messages that include CISS information may be transported using the data layer 304, but may be handled differently by components of the core network 202 and the mobile device 110 because of their control layer formatting.

Figure 4A:
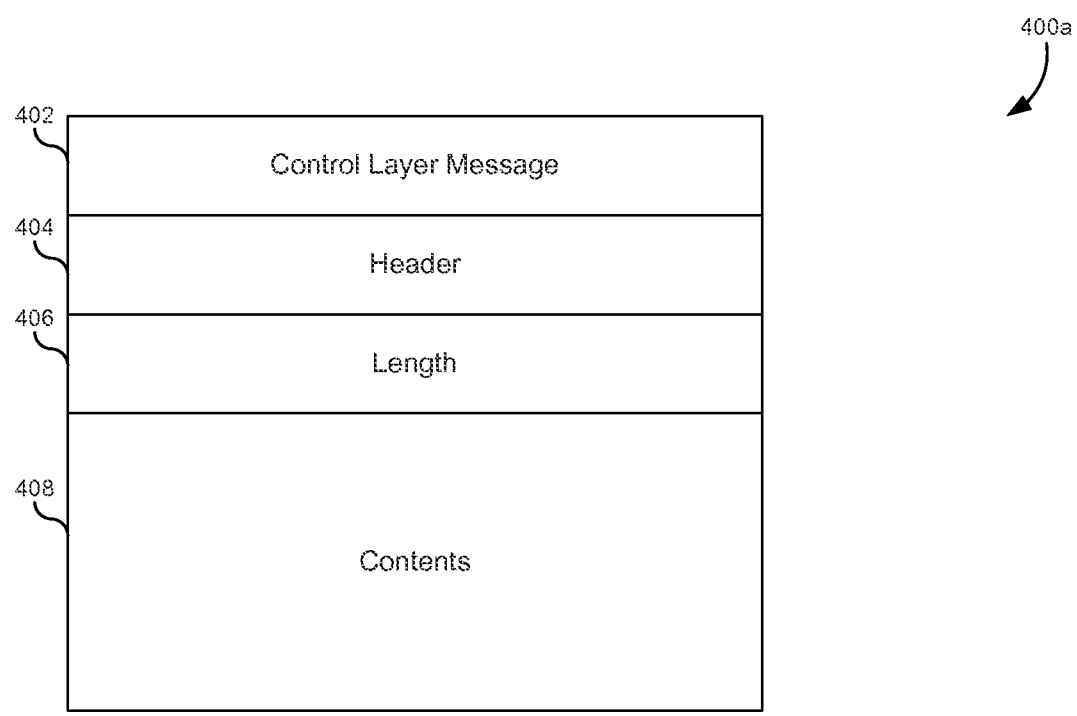
FIG. 4A illustrates a block diagram of a control layer message format, according to one embodiment.

FIG. 4A illustrates a block diagram of a control layer message format 400, according to one embodiment. In some embodiments, a control layer message may be referred to as a "NAS message". Specifically, for messages transmitted from a device to the core network, an "Uplink NAS Transport" or "Uplink Generic NAS Transport" message format can be used. Similarly, for messages transmitted from the core network to a device, a "Downlink NAS Transport" or "Downlink Generic NAS Transport" message format can be used.

The control layer message 402 may include a number of different fields that are not specifically shown in FIG. 4A. The controller message 402 may include a message header 404. The message header 404 may be used by the device and/or components of the core network to distinguish the control layer messages.

The control layer message 402 may also include a message length 406 that describes the length of the message contents 408.

The control layer message 402 may also include the message contents 408, which may also be referred to as the message payload. In some embodiments, the message header 404 or the first octet of contained message in message contents 408 may be used to distinguish the contained message by the device and/or components of the core network. For example, the contained message may include a unique code that distinguishes a CISS message (or an SS message) from other types of information. In some embodiments, SMS messages may also be transmitted in control layer messages when either the core network or the mobile device could otherwise require an operating mode change. The contained message may comprise a half octet, such as a Protocol Discriminator (PD). For example, the value of '9' may signify an SMS message, while the value of '11' may signify SS/CISS information.

In one embodiment, the message contents 408 may be formatted as a "NAS Message Container" of one of the existing LTE message types, such as the "Uplink NAS Transport" message type. CISS data related to a CISS operation may be packaged within the message contents 408 and may be formatted to match any formatting requirements of the "NAS messages Container" format.

It will be understood that controller message 402 depicted by FIG. 4 is merely exemplary, other types of information may also be included in the control layer message 402 that has been omitted for brevity. Therefore, the particular controller message 402 described here is not meant to be limiting.

Figures 4B, 4C:
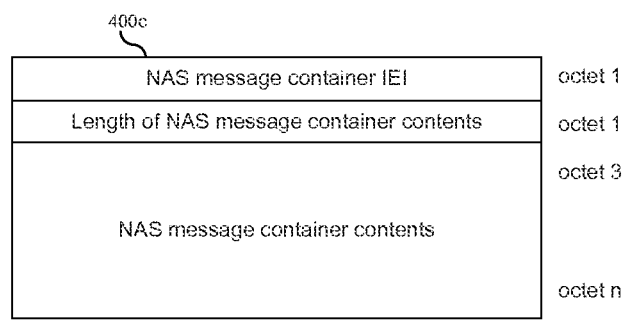
FIG. 4B illustrates a block diagram of a NAS Uplink/Downlink transport message format, according to one embodiment.
FIG. 4C illustrates a block diagram of a NAS message container format, according to one embodiment.

FIG. 4B illustrates a block diagram of a NAS Uplink/Downlink transport message format 400b, according to one embodiment. As mentioned above, this message format is an existing message format that can be easily accepted by existing LTE network protocols.

The NAS message container field may be used to include a CISS data payload. It will be understood that this particular message format may be used by some embodiments. However, other embodiments may use different message formats that may also be classified as control layer messages. Therefore, the Uplink/Downlink NAS transport message is not meant to be limiting.

FIG. 4C illustrates a block diagram of a NAS message container format 400c, according to one embodiment. This format may be similar to the format of the generic control layer message format 402 depicted in FIG. 4A. This message format 400c may be divided into a sequential series of octets. The first octet may contain a "NAS message container IEI" identifier. The second octet may include a length of the NAS message container content. The remaining octets may include the NAS message container contents. In this particular embodiment, the existing message format may be used to include identifiers and information associated with CISS data. For example, the PD in the first octed of the NAS message container contents may be used to identify a CISS data payload. In some embodiments, the NAS message container format 400c may be incorporated as the NAS message container in FIG. 4B described above.

Figure 5:
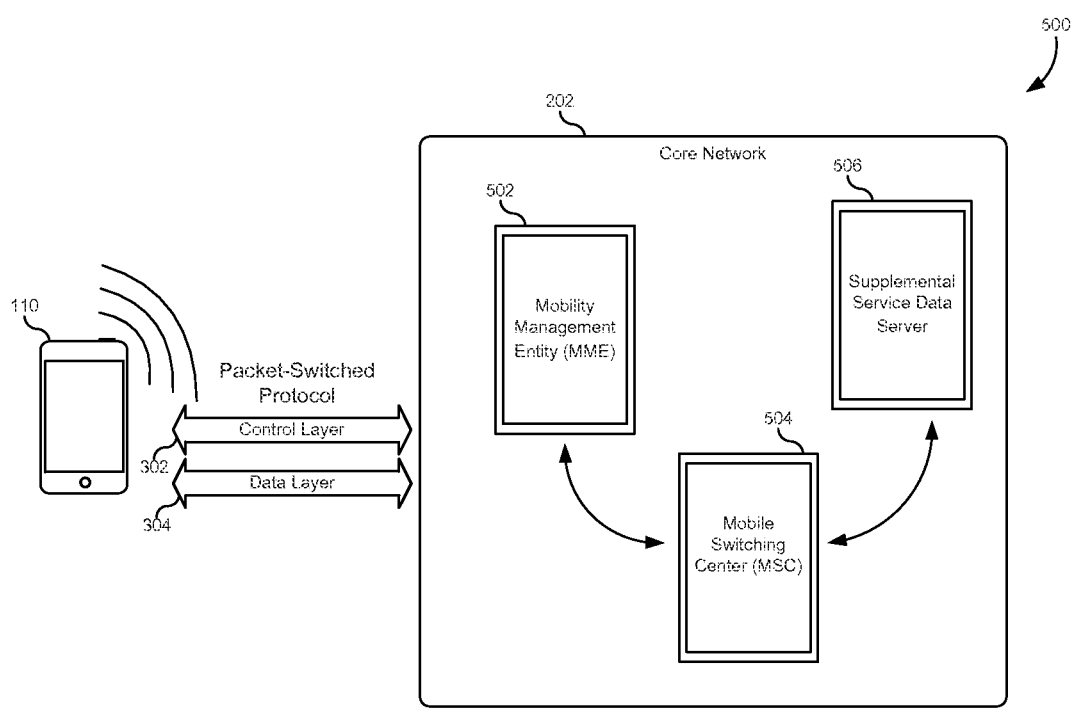
FIG. 5 illustrates a block diagram of a core network, according to one embodiment.

FIG. 5 illustrates a block diagram 500 of a core network 202, according to one embodiment. Information sent by a device 110 through a control layer 302 and/or a data layer 304 can reach various parts of the core network 202. In one embodiment, the core network 202 may include a mobile switching center (MSC) 504 that is configured to control network switching subsystem elements. The mobile switching center 504 may also be configured to direct information traffic. In one embodiment, the mobile switching center 504 may be configured to recognize a control layer message that includes CISS data.

The mobile switching center 504 may be further configured to extract any CISS data from a control layer message and forward the extracted CISS data to a supplemental service data server 506. In some embodiments, the extracted CISS data may be formatted as Unstructured Supplementary Service Data (USSD). USSD is a protocol used by GSM cellular telephones to communicate with service provider computers. The supplemental service data server 506 may be configured to analyze the CISS data and in some cases provide a response.

The core network 202 may also include one or more mobility management entities 502. The mobility management entity 502 may be configured to monitor, manage, and or support mobile devices that are deploys across mobile operators. This may include distribution of applications, as well as data and configuration settings for all types of devices. In one embodiment, the mobility management entity 502 may be configured to receive a control layer message from a device and forward it to a mobile switching center 504.

In some embodiments, the core network 202 may include many additional components in addition to those shown specifically in FIG. 5. In many cases, the core network 202 will include many distinct mobility management servers 502, mobility switching servers 504, and/or supplemental service data servers 506. Other routers, servers, and equipment may also be used to provide different types of mobile communication operations for the device 110.

Figure 6A:
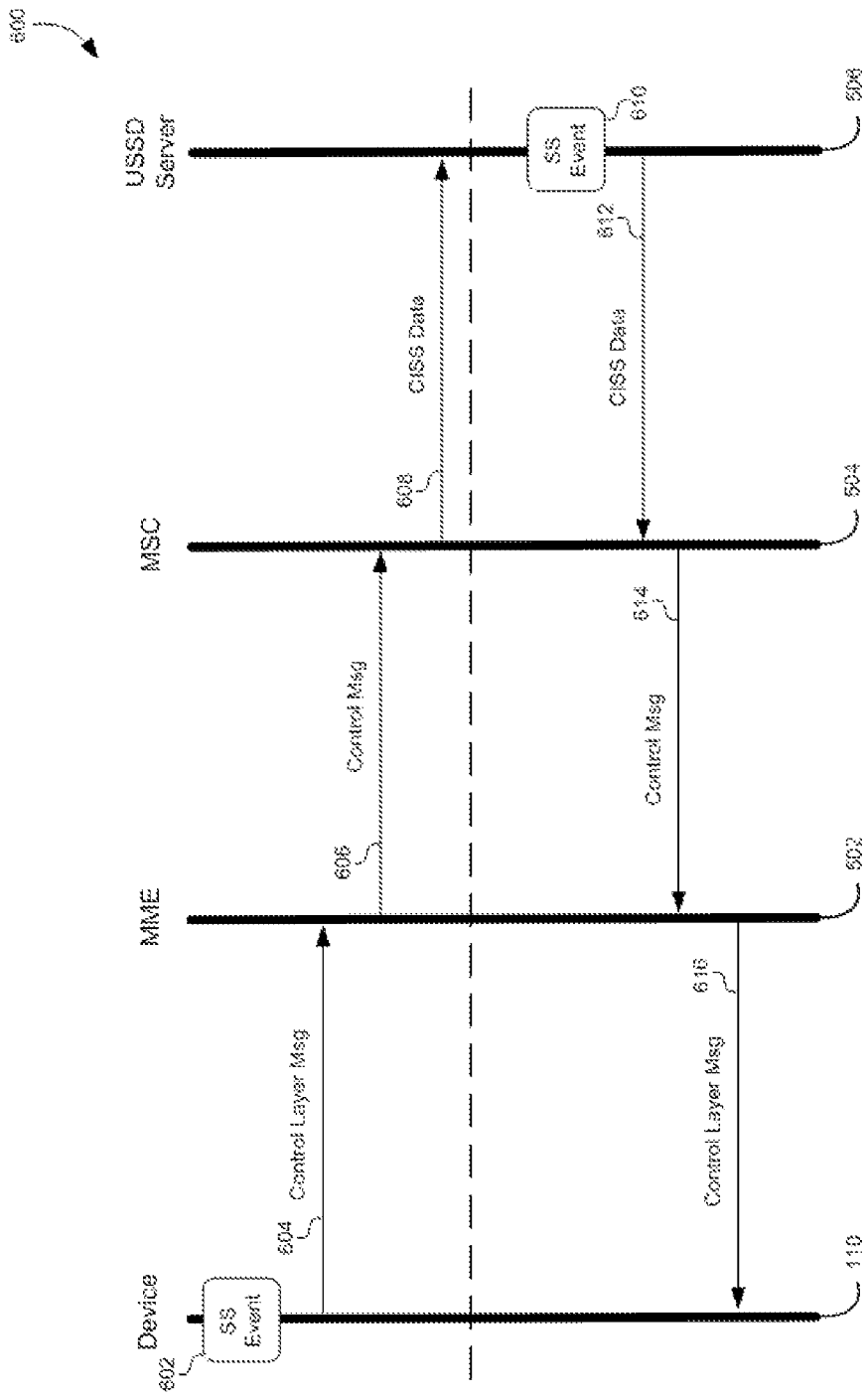
FIG. 6A illustrates a transaction diagram for control layer messages, according to one embodiment.

FIG. 6A illustrates a transaction diagram 600a for control layer messages, according to one embodiment. In some embodiments, an SS event 602 may occur. The SS event 602 may comprise a CISS event. The SS event may be initiated by a user action, such as requesting an account balance. The SS event may also be initiated by a component of the core network. The SS event may also be initiated by the device 110.

Device 110 may then package information associated with the SS event in a control layer message, and cause the control layer message to be transmitted to a mobile management entity (MME) 502 (604). Along with other operations, the mobile management entity 502 may transmit the control layer message to a mobile switching center (MSC) 504 (606). In some embodiments, the mobile management Center 502 may repackage the control layer message into a different message format.

The mobile switching center 504 may receive the control message, or control layer message, from the mobile management entity 502. The mobile switching center 504 may analyze one or more portions of the message in order to determine whether the message includes CISS data. In some embodiments, the mobile switching center 504 may also extract the CISS data. Regardless of the format, the CISS data may be transmitted to the supplementary service data server 506 for processing (608).

The bottom half of the transaction diagram 600 may describe a new event that originates with the supplemental service data server 506. Alternatively, the bottom half of the transaction diagram 600 may describe a response to the CISS data received from the device 110 as a result of SS event 602. In either case, the supplemental service data server 506 may present CISS data to be transmitted through the core network to the device 110.

In this example, SS event 610 (being either new or generated in response to SS event 602) may trigger the supplemental service data server 506 to transmit the CISS data to the mobile switching center 504 (612). The mobile switching center 504 may package the CISS data into a control message, or a control layer message, which can then be sent to the mobile management entity 502 (614). The mobile management entity 502 can then repackage the control message if necessary, and forward a control layer message to the device 110 (616). Note that other transactions may also be present that are not specifically shown in FIG. 6.

Figure 6B:
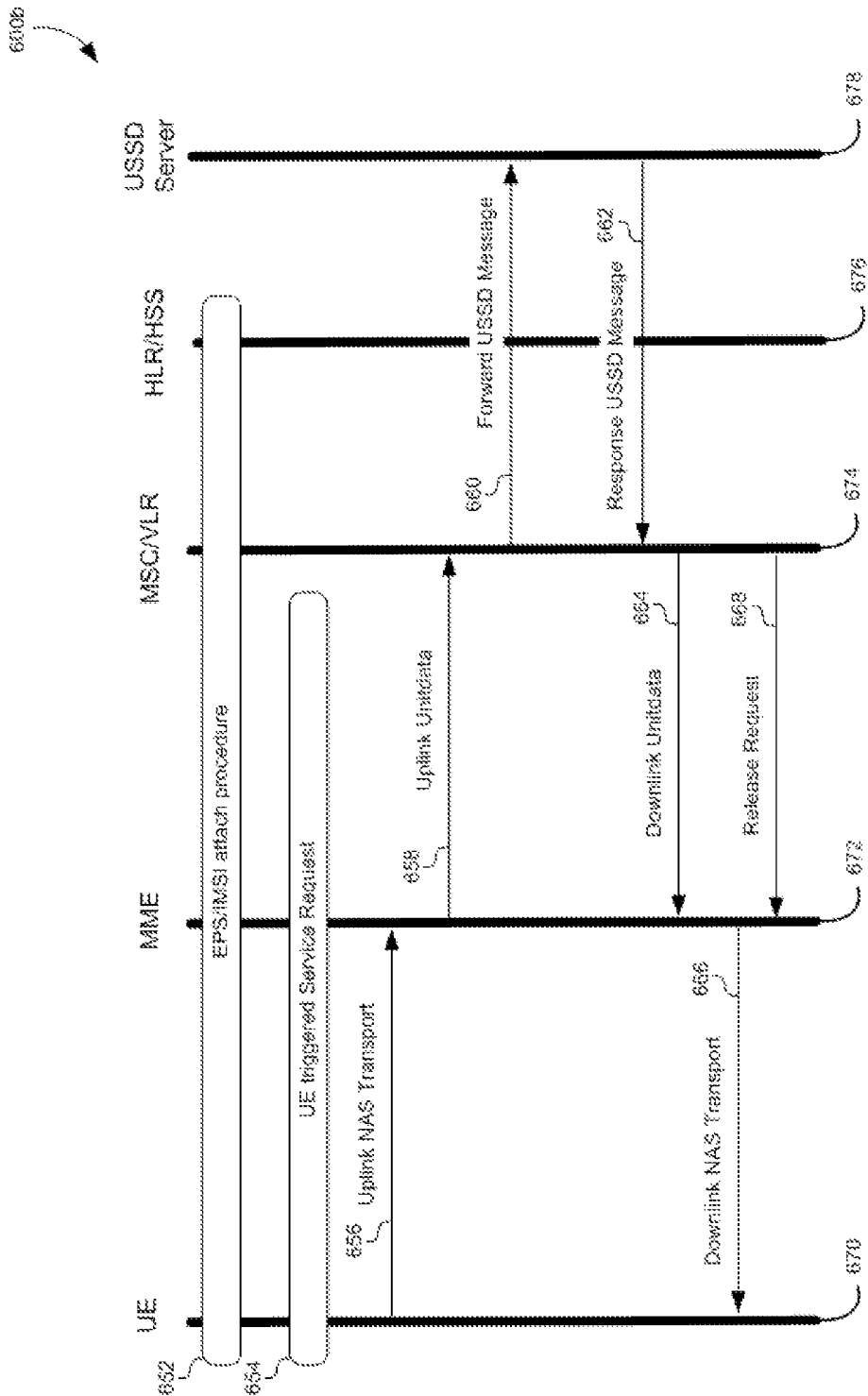
FIG. 6B illustrates a transaction diagram for NAS Transport messages, according to one embodiment.

FIG. 6B illustrates a transaction diagram 600b for NAS Transport messages, according to one embodiment. After device, or user equipment (LTE) 670, has been registered with an LTE network using, for example, a "combined attach" process (652), the LTE 670 may trigger a service request involving SS data. The UE 670 can establish a signaling connection in the packet-switched domain with the LTE network. In some embodiments, this may be similar to signaling the establishment of a connection for sending SMS messages in the packet-switched domain of the LTE network.

An Uplink NAS Transport message may be instantiated to contain the CISS data in the message payload. The Uplink NAS Transport message may be sent to the MME 672 (656). In turn, the MME 672 can transmit the message to the MSC 674 using an Uplink Unit data message format (658). The MSC 674 can unpack the NAS Message Container and analyze the Protocol Discriminator in the contained message of the NAS message container contents. If the NCS 674 determines that the NAS Message Container includes SS data, the NCS 674 can judge whether an interactive element, such as a USSD server 678 should receive the SS data, depending on the content of the SS message. The SS data can then be forwarded as a. USSD message to a USSD server 678 (660).

The reverse transactions may also take place in the reverse order. The USSD server 678 may send a response USSD message to the NCS 674 (662). The NCS 674 can then send Downlink Unit data to the MME 672 (664). The MME 672 can then send a Downlink NAS Transport message to the UE 670 (666). Additionally, these transactions may be reordered or may involve other hardware devices associated with the core network.

Figure 7:
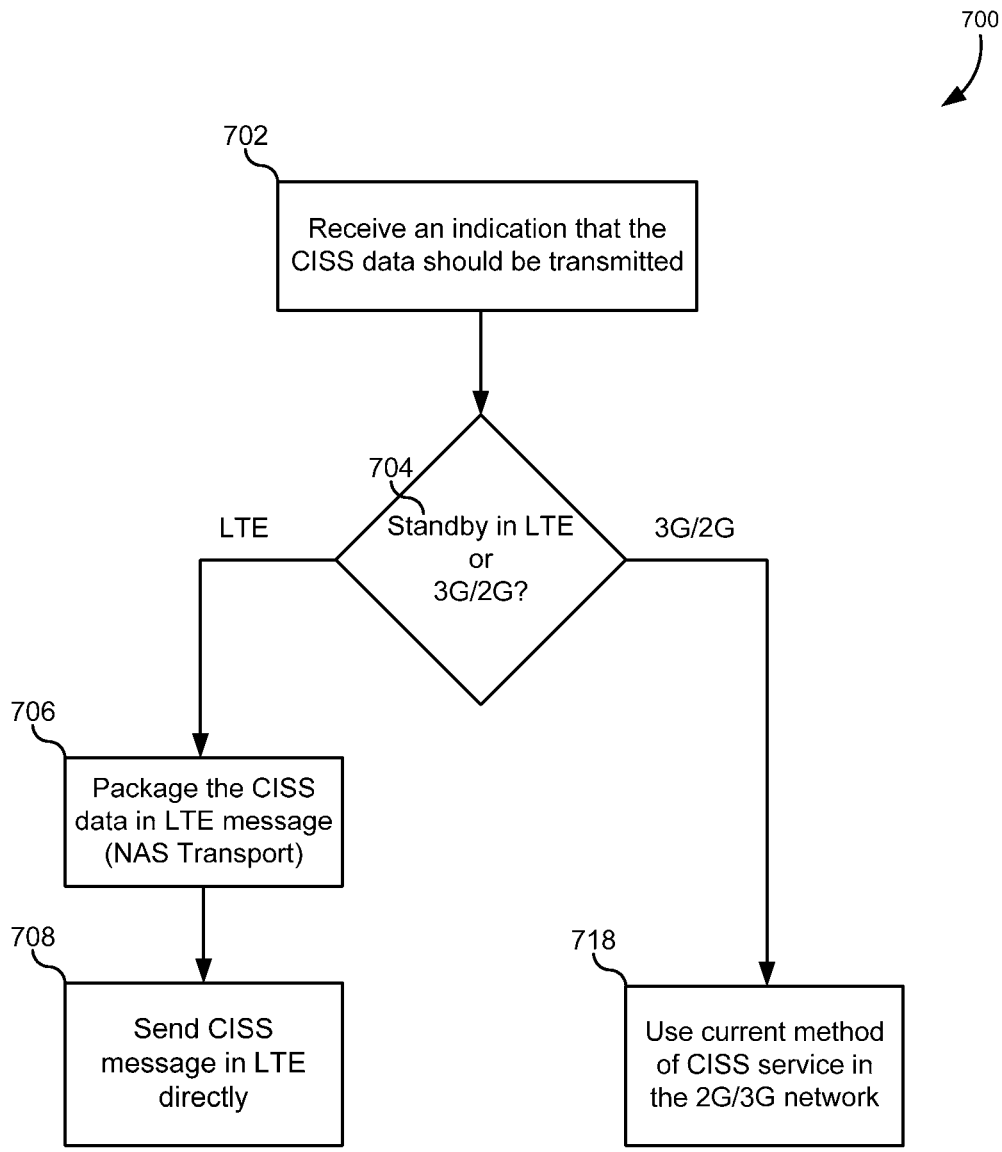
FIG. 7 illustrates a flowchart of a method for optimizing transactions involving Call Independent Supplementary Service (CISS) data on a device, according to one embodiment.

FIG. 7 illustrates a flowchart 700 of a method for optimizing transactions involving CISS data on an LTE device, according to one embodiment. In some embodiments, the sender (which can be NAS module) of the CISS data may first determine the network that device is in a standby LTE mode. The CISS data may then be transmitted according to the network that the device is currently in, in other words, embodiments implementing this method may avoid CSFB from LTE to 3G/2G while maintaining full CISS operational capability.

The method may include receiving an indication that the CISS data should be transmitted (702). The indication may be provided by a user, by the device, or by a component in the core network. The indication may be triggered by a thresholding event, such as surpassing an account balance, or may be triggered by a periodic event, such as passing a certain day of the month, or may be triggered by user operation at any time.

The method may also include determining whether the device is in a standby LTE mode or in a 3G/2G network mode (704). If the device is sending the CISS data, the device may simply determine the type of network with which the device is currently configured to operate with. If a component of the core network is sending the CISS data, the core network may query registration information of the device, to know which network the device is currently configured to operate with.

If it is determined that the device is standing by in a packet-switched LTE network, the CISS data may be packaged in a control layer message (706). For example, the device may be standing by in a packet-switched LTE network if the device is currently accessing Internet data, or has not made a voice transmission for a threshold time interval. In some embodiments, the control layer message may comprise a NAS uplink/downlink message type, such as an Uplink/Downlink NAS Transport message. In some embodiments, the control layer message may comprise a payload section that includes the CISS data, which may also comprise a header that is used to distinguish the CISS data from other types of data.

After packaging the CISS data in a control layer message, the method may also include sending the control layer message in the packet-switched LTE network (708). This may include a component of the core network sending the control layer message to the device. This may also include the device sending the control layer message to a component of the core network. In one embodiment, the control layer message may be sent through an AS transport layer.

If it is instead determined that the device is standing by in a 2G/3G network, the CISS data may be packaged in an SS service message of the 2G/3G network. In some cases, the device may be operating in a 3G/2G network if the device is currently making a phone call, or has recently made a phone call. The data layer message may comprise any message format currently known in the art for transmitting CISS data over a 3G/2G network. After packaging the CISS data in a data layer message, the method may include sending the data layer message in the 3G/2G network. This may include a component of the core network sending the data layer message to the device. This may also include the device sending the data layer message to a component of the core network.

Figure 8:
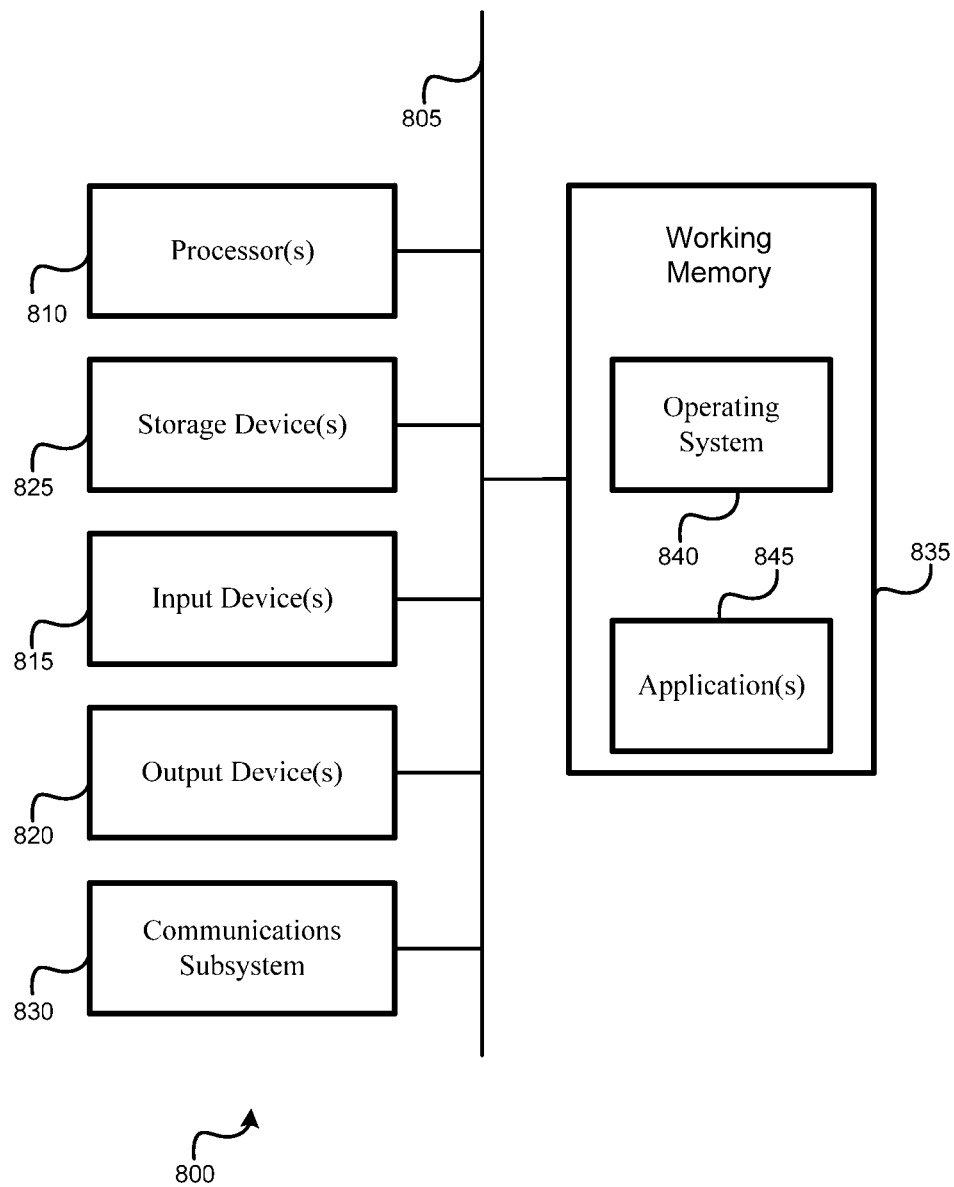
FIG. 8 illustrates a block diagram of an exemplary computer hardware system that may be used to implement various embodiments.

FIG. 8 illustrates a block diagram of an exemplary computer system 800 that may be used to implement various embodiments. Some embodiments may employ a computer system (such as the computer system 800) to perform methods in accordance with various embodiments of the invention. The computer system may be implemented using various circuits, microchips, and connections within a mobile device, a server, a router, and/or the like. For example, elements of computer system 800 may be implemented on a mobile device, such as a smart phone. In another example, elements of computer system 800 may be implemented in a server as part of a core network.

According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The output devices 820 may include a screen on a smart phone. The screen may be configured to display a user interface for CISS operations. For example, the screen may be configured to display a user interface allowing the user to select a call waiting option. In another example, the screen may be configured to display a user interface allowing the user to select a call forwarding option.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc, carried by the signals) to the working memory 835, from which the processor(s) 810 retrieves and executes the instructions. The instructions received by the working memory 835 may optionally be stored on a non-transitory storage device 825 either before or after execution by the processor(s) 810.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of tire claims.

What is claimed is:

1. A method of optimizing transactions involving Call Independent Supplementary Service (CISS) data on a Long Term Evolution (LTE) device, the method comprising:
    receiving an indication that the CISS data should be transmitted between the device and a core network, wherein the indication is triggered by a thresholding event, the thresholding event being a surpassing of an account balance;
    determining whether the device is standing by in a packet-switched LTE network or standing by in a 3G/2G network, wherein determining whether the device is standing by in the packet-switched LTE network or standing by in the 3G/2G network includes querying, by the core network, registration information of the device, and wherein the device is standing by in the packet-switched LTE network when the device has not made a voice transmission for a threshold time interval;

in response to the determination that the device is standing by in the packet-switched LTE network:
packaging the CISS data in a control layer message, wherein the control layer message comprises a payload section that includes the CISS data; and
sending the control layer message between the core network and the device in the packet-switched LTE network through an Access Stratum (AS) layer; or in response to the determination that the device is standing by in the circuit-switched 3G/2G network:
sending the CISS data between the core network and the device in the circuit-switched 3G/2G network.

2. The method of claim 1, wherein the device comprises a mobile phone.

3. The method of claim 1, wherein the AS layer is a data layer, and wherein the control layer message comprises a NAS message.

4. The method of claim 3, wherein the NAS message comprises a header that indicates that the control layer message comprises the CISS data in NAS message container contents.

5. The method of claim 3, wherein the NAS message comprises an Uplink NAS Transport or a Downlink NAS Transport message.

6. The method of claim 1, wherein the core network comprises:
a mobile switching center,
a mobility management entity, and
a supplemental service data server.

7. The method of claim 6, further comprising:
determining, by the mobile switching center, that the control layer message comprises the CISS data; and
transmitting the CISS data to the supplemental service data server.

8. The method of claim 1, further comprising in response to a determination that the device is standing by in the circuit-switched 3G/2G network:
packaging the CISS data in a data layer message; and
sending the data layer message between the core network and the device in the circuit-switched 3G/2G network.

9. A non-transitory computer-readable memory having stored thereon a sequence of instructions which, when executed by one or more processors, causes the one or more processors to optimize transactions involving CISS data on an LTE device by:
receiving an indication that the CISS data should be transmitted between the device and a core network, wherein the indication is triggered by a thresholding event, the thresholding event being a surpassing of an account balance;
determining whether the device is standing by in a packet-switched LTE network or standing by in a 3G/2G network, wherein determining whether the device is standing by in the packet-switched LTE network or standing by in the 3G/2G network includes querying registration information of the device, and wherein the device is standing by in the packet-switched LTE network when the device has not made a voice transmission for a threshold time interval;
in response to the determination that the device is standing by in the packet-switched LTE network:
packaging the CISS data in a control layer message, wherein the control layer message comprises a payload section that includes the CISS data; and
sending the control layer message between the core network and the device in the packet-switched LTE network through an Access Stratum (AS) layer; or
in response to the determination that the device is standing by in the circuit-switched 3G/2G network:
sending the CISS data between the core network and the device in the circuit-switched 3G/2G network.

10. The computer-readable memory of claim 9, wherein the device comprises a mobile phone.

11. The computer-readable memory of claim 9, wherein the AS layer is a data layer, and wherein the control layer message comprises a NAS message.

12. The computer-readable memory of claim 11, wherein the NAS message comprises an Uplink NAS Transport or a Downlink NAS Transport message.

13. The computer-readable memory of claim 11, wherein the NAS message comprises a header that indicates that the control layer message comprises the CISS data in NAS message container contents.

14. The computer-readable memory of claim 9, wherein the core network comprises:
a mobile switching center,
a mobility management entity, and
a supplemental service data server.

15. The computer-readable memory according to claim 14, wherein the instructions further cause the one or more processors to optimize transactions involving CISS data on an LTE device by:
determining, by the mobile switching center, that the control layer message comprises the CISS data; and
transmitting the CISS data to the supplemental service data server.

16. The computer-readable memory according to claim 9, wherein the instructions further cause the one or more processors to optimize transactions involving CISS data on an LTE device by, in response to a determination that the device is standing by in the circuit-switched 3G/2G network:
packaging the CISS data in a data layer message; and
sending the data layer message between the core network and the device in the circuit-switched 3G/2G network.

17. A mobile device comprising:
one or more processors; and
a memory communicatively coupled with and readable by the one or more processors and having stored therein a sequence of instructions which, when executed by the one or more processors, cause the one or more processors to optimize transactions involving CISS data on an LTE device by:
receiving an indication that the CISS data should be transmitted between the device and a core network, wherein the indication is triggered by a thresholding event, the thresholding event being a surpassing of an account balance;
determining whether the device is standing by in a packet-switched LTE network or standing by in a 3G/2G network, wherein determining whether the device is standing by in the packet-switched LTE network or standing by in the 3G/2G network includes querying registration information of the device, and wherein the device is standing by in the packet-switched LTE network when the device has not made a voice transmission for a threshold time interval;
in response to the determination that the device is standing by in the packet-switched LTE network:

packaging the CISS data in a control layer message, wherein the control layer message comprises a payload section that includes the CISS data; and sending the control layer message between the core network and the device in the packet-switched LTE network through an Access Stratum (AS) layer; or in response to the determination that the device is standing by in the circuit-switched 3G/2G network:

sending the CISS data between the core network and the device in the circuit-switched 3G/2G network.

18. The mobile device of claim 17, wherein the core network comprises:
a mobile switching center,
a mobility management entity, and
a supplemental service data server.

19. The mobile device of claim 18, wherein the instructions further cause the one or more processors to optimize transactions involving CISS data on an LTE device by:
determining, by the mobile switching center, that the control layer message comprises the CISS data; and
transmitting the CISS data to the supplemental service data server.

20. The mobile device of claim 17, wherein the AS layer is a data layer, and wherein the control layer message comprises a NAS message.

* * * * *